(12) United States Patent
Cabrera et al.

(10) Patent No.: US 7,370,053 B2
(45) Date of Patent: May 6, 2008

(54) COORDINATING TRANSACTIONAL WEB SERVICES

(75) Inventors: Luis Felipe Cabrera, Bellevue, WA (US); Johannes Klein, Sammamish, WA (US); Satish Thatte, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 11/350,851

(22) Filed: Feb. 10, 2006

(65) Prior Publication Data

US 2006/0136427 A1    Jun. 22, 2006

Related U.S. Application Data

(63) Continuation of application No. 10/211,299, filed on Aug. 5, 2002, now Pat. No. 7,047,243.

(51) Int. Cl.
*G06F 17/30* (2006.01)
(52) U.S. Cl. ............................................. 707/10; 707/1
(58) Field of Classification Search ................ 707/1–6, 707/10, 200–202
See application file for complete search history.

(56) References Cited

U.S. PATENT DOCUMENTS

| | | | |
|---|---|---|---|
| 6,285,989 B1 | | 9/2001 | Shoham |
| 6,341,353 B1* | | 1/2002 | Herman et al. ................. 726/5 |
| 6,513,059 B1* | | 1/2003 | Gupta et al. .................. 709/202 |
| 6,542,912 B2* | | 4/2003 | Meltzer et al. ........... 715/501.1 |
| 6,587,838 B1 | | 7/2003 | Esposito et al. |
| 6,659,861 B1 | | 12/2003 | Faris et al. |
| 6,697,824 B1* | | 2/2004 | Bowman-Amuah ......... 709/229 |
| 6,763,384 B1 | | 7/2004 | Gupta et al. |
| 6,839,896 B2 | | 1/2005 | Coffman et al. |
| 7,149,754 B2* | | 12/2006 | Miller et al. ............. 707/104.1 |

OTHER PUBLICATIONS

H. Schuldt et al., "Atomicity and Isolation for Transactional Processes", ACM Transactions on Database Systems, vol. 27, No. 1, Mar. 2002, pp. 63-116.

H. Breitwieser et al., "A Distributed Transaction Processing Protocol Based On Majority Consensus", Association For Computing Machinery, Aug. 1982, pp. 224-237.

J. Wäsch et al., "Transactional Support for Cooperative Applications", NATO Advanced Study Institute On Workflow Management System (WFMS), 1998 pp. 304-338.

J. Blakeley., "Data Access for the Masses through OLE DB", Special Interest Group On The Management of Data, vol. 25, No. 2, Jun. 1996, pp. 161-172.

(Continued)

*Primary Examiner*—Yicun Wu
(74) *Attorney, Agent, or Firm*—Workman Nydegger

(57) ABSTRACT

The present invention relates to coordinating web services wherein a coordination service acts as a rendezvous point through which participants such as web services may register to obtain protocol information to coordinate an outcome of an activity. The coordination of the activity may be accomplished through behaviors that may be expressed by message exchange protocols prescribed by the participants or web services themselves in an open-ended manner. A method and apparatus is also provided for coordinating web service activity with associated behaviors. Transactional coordination may be performed using the ACID model for activities requiring strict consistency or may be based on compensation actions for long running transactions, for example.

5 Claims, 7 Drawing Sheets

OTHER PUBLICATIONS

E. Rahm, "Empirical Performance Evaluation of Concurrency and Coherency Control Protocols for Database Sharing Systems", Association For Computing Machinery, vol. 18, No. 2, Jun. 1993, pp. 333-377.

J. Yang et al., "JpemLite: An Extensible Transaction Server for the World Wide Web", Association For Computing Machinery, 1998, pp. 256-266.

N. Katoh et al., "Cautious Transaction Schedulers with Admission Control", ACM Transactions On Database Systems, vol. 10, No. 2, Jun. 1985, pp. 205-229.

Hui-I Hsiao, "DLFM: A Transactional Resource Manager", Special Interest Group On The Management Of Data, vol. 29, No. 2, May 2000, pp. 518-528.

P. Bernstein et al., "Concurrency Control in Distributed Database Systems", ACM Computing Surveys, vol. 13, No. 2, Jun. 1981, pp. 185-221.

A. Zhang et al., Ensuring Relaxed Atomicity for Flexible Transactions in Multidatabase Systems, Special Interest Group On The Management Of Data, vol. 23, No. 2, May 1994, pp. 67-78.

\* cited by examiner

COORDINATING TRANSACTIONAL WEB SERVICES

This application is a continuation of and claims priority to U.S. application Ser. No. 10/211,299, filed Aug. 5, 2002 now U.S. Pat. No. 7,047,243, incorporated herein in its entirety.

TECHNICAL FIELD

The present invention relates generally to web services, and in particular to coordinating web service interactions including coordinating the outcome of web service transactions according to specific protocols.

BACKGROUND OF THE INVENTION

Web services, generally, refers to web-based applications that interact with other web-based applications in order to provide a desired service. For example, application software on a user's desktop computer (e.g., Microsoft Money) may send messages via the Internet to a stock quote server in order to retrieve current stock quotes for selected stocks. The application software may then display the retrieved information within the application for the user. Other examples of common web services include banking, currency converters, airplane flight schedule lookups, auction services and language translation services.

Integral to the widespread success of web services is the use of common data representations, common message formats and descriptions of operations for application-to-application communication over the Internet. Web services may be provided by a computer or any message-based computing service participating in any general-purpose computation, procedure or activity. Using these common data representations, formats and descriptions of operations, applications may use web services to interact with other applications to produce a common outcome for an activity, e.g., debiting an account in a banking transaction.

Multi-process coordination for transaction outcome for web services has been demonstrated to be of critical importance. Multi-process coordination, generally, refers to computer systems or web services in different environments communicating by exchange of messages using pre-defined protocols. It is desirable to achieve coordination of general purpose computations or activities between multiple web services or participants in order to achieve a coordinated outcome of distributed applications for a transaction. For example, in a banking transaction transferring money from one account to a second account, the results could be disastrous if the second account was credited with funds, but the first account was not correspondingly debited.

Transaction coordination was traditionally required to pass the ACID (Atomic, Consistent, Isolation and Durable) test. In particular, the transaction needs to be atomic such that the transaction is completed in its entirety or not at all. That is, if an atomic transaction will not be completed, it becomes completely undone. For example, if a transaction had been commenced but not completed and an event occurred that compromised the transaction, making completion of the transaction infeasible, the operations completed thus far could be undone such that the data could be "rolled back" to its original state.

The transaction also needs to be consistent. That is, given the same state, inputs, etc., the same result should occur. Next, each transaction needs to work in isolation such that one process does not interfere with the functioning of another process. In this way, different processes can be occurring in parallel with no single process adversely affecting the operation or results of any of the other processes. Finally, the transactions need to be durable so that the transactions, once completed, remain permanent even in the event of a system failure. That is, with durability, the result remains in the system even upon restart.

Web services systems may take many forms. In one type of system, web services or participants may be interconnected to each other to form a complete system that does not interact with other systems that are not connected, e.g., a local area network. Such a system has traditionally been referred to as a "glass house" system because the system may be self-contained without interference from external influences (such as external web services via a wide area network) without access authority. Thus, in the traditional glass house system, there may be many computers interconnected in a variety of ways to achieve an outcome within the privacy of the system. Systems may operate on a given computer, on several networked computers within the glass house or domain of trust, or the system may be extended to incorporate additional models of transactional behaviors.

Coordination of the computations carried out by multiple web services or participants in the form of an activity to achieve a joint outcome is desirable with the advent of computing outside the glass house, e.g., web services via the Internet, external to the self-contained system of interconnected web services or participants accessing the system. Coordination of activities with web services or participants between a glass house system (i.e., a self-contained system) with web services or participants outside of the glass house system, for example, across domains of trust or with individual endpoints (i.e., computers or web services) that may be located in distant locations as well as distant from each other may become problematic. Web services in different domains of trust, for example, must still perform as one enterprise but problems may arise due to the complex relationships between the participants, business latencies causing the execution of activities to take a long time, and user interactions. For example, web services providers may be located in different countries creating a distributed computing scenario. Regardless of the distributed nature of the system and the dissolution of the glass house, coordination of the outcome and agreement between the endpoints should be achieved.

Prior art systems utilize ACID resource managers operating on a given computer. Activity or changes in a system or resource is noted by resource managers enabling physically committing or rolling back changes in the system. Groups of ACID resource managers may operate on several networked computers but typically within one domain of trust. Durable queue managers have been used to extend the use of transactions to asynchronous services operating on different domains of trust. Transactional behavior is provided at each of the end points with message transmission between the end points.

However, in prior systems, participants or web services coordinate an activity with other web services by accessing predetermined protocols. The predetermined protocols determine the behavior and the transactional outcome of activities are determined by transactional behavior that is provided at each web service or endpoint in the system.

For example, in a prior art file system, the activity may be a data update. Participants or web services might not prescribe the manner of message exchange and might not orchestrate the communication of messages (i.e., protocols) to coordinate the activity between different participants. Behavior or protocols are instead provided at each of the participants or web services themselves. However, each of the participants or web services might be unable to optimally coordinate the outcome of a joint activity. In particular, for a file service and a web service to jointly perform a data update according to a behavior described by a protocol, there is no current manner to establish and control this coordination in an open-ended fashion.

Likewise, in a prior art credit/debit system, a participant or web service may be a user attempting to perform a financial transaction such as making a withdrawal from a financial institution. The activity (i.e., funds withdrawal) needs to be coordinated between the participants in the withdrawal such that a coordinated transactional outcome is attained, i.e., the withdrawal is successfully completed. However, in the prior art credit/debit systems, the participants are provided with predetermined transactional behavior at each of the endpoints with message transmission between the endpoints. Although geographically distributed services may operate in this manner, coordinating the outcome of a joint activity (i.e., withdrawal from an account and deposit in another one) is problematic as the protocols are pre-specified by a coordinator and not specified by the participants themselves. This results in diminished flexibility in the system and difficulty in coordinating the outcome of a joint activity in an extensible manner.

Thus, there is a lack of flexibility in coordinating activity between web services in an extensible manner. For example, a new web service that wants to participate in an activity with another web service would need to conform to the provided transactional behavior to coordinate activities with the other web service. This problem is magnified when web services or participants operate on several domains of trust. Notably, the prior art systems lack the proper infrastructure to provide for handling loosely-coupled web services to coordinate the outcome of an activity. Because agreements are only achieved through a prescribed fixed set of protocols and the participants or web services themselves do not orchestrate the protocols and messages themselves to coordinate the activity between the web services, web services not supporting a particular protocol may not effectively coordinate activities with other web services.

Thus there is a need in the art for a method and apparatus for allowing the coordination of activities by multiple web services such that new web services may dynamically obtain or utilize proper protocol information and participate in an activity with another web service. By accomplishing coordination of transactional activity in an extensible manner, additional web services may more efficiently join in an activity with another web service according to protocols specified dynamically by the participants or web services themselves.

SUMMARY OF THE INVENTION

The disadvantages of the existing transaction coordination systems are significantly overcome in the present invention in which participants or web services participate in activities in which the participants access a rendezvous point or coordinator to register into the activity in an extensible manner.

The transactional outcome of operations is specified by the web services. The behavior of the operations may be specified by protocols, which specify the messages to be exchanged, the set of valid messages to be exchanged or the order of exchange of messages. Thus, the behavior is described through message exchange protocols. The behavior to operate under may be expressed as a protocol that specifies the set of valid messages to be interchanged and the sequence in which these messages are exchanged. A coordination service or coordinator is provided which coordinates activities of web services or participants by registering protocol descriptions associated with activities. The participants themselves may exchange messages to orchestrate the outcome of an activity through the coordination service.

In one example, participants or web services may participate in activities in roles that tie them to a behavior. An activity is created by an activity creator, for example, the activity created having a behavior. The behavior may be expressed by a protocol or a plurality of protocols, which may describe message exchanges. A coordinator or coordination service may serve as a rendezvous point that allows participants or web services to participate in the activity. Participants or web services may, for example, register for the activity via the coordinator based on the behavior of the activity and the protocols that express the behavior.

In another example, a first web service creates an activity and communicates with a coordination service to create a set of protocols associated with the newly created activity. The protocols or specified exchanges of messages may be maintained in the coordination service such that the coordination service may serve as a rendezvous point for registration of other web services. The other web services or participants may register with the registration service of the coordination service and obtain information on the protocols associated with the activity. The other web services, through message exchanges and protocol information, may determine if participation in the coordinated outcome of the activity may be accomplished.

In another example, a plurality of web services may register with a coordination service to participate in a joint activity. At least one web service may be unable to complete the activity. The web service that is unable to complete the activity may issue a "faulted" notification to the coordination service which indicates to the coordination service that the activity will not be completed. The coordination service functions as a rendezvous point such that after receiving the "faulted" notification, a fault handler at the coordination service may reset web services that have already completed the activity and have issued "completed" notifications. The activity is terminated and data is restored to its original state.

The invention also includes an apparatus or coordination service that enables coordination of web services activity. The apparatus or coordination service contains an activation service for creating a protocol or set of protocols associated with an activity to be accomplished. The apparatus or coordination service may further comprise a registration service where web services may register and obtain information on protocols associated with an activity in which the web services may participate.

DETAILED DESCRIPTION OF THE INVENTION

The present invention overcomes the problems of providing for coordination of the outcome of joint activity between web services or participants in an extensible manner. In particular, message exchange protocols that may be specified by web services or participants are utilized in a coordinator to coordinate the actions of the participants themselves.

The invention is operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1:
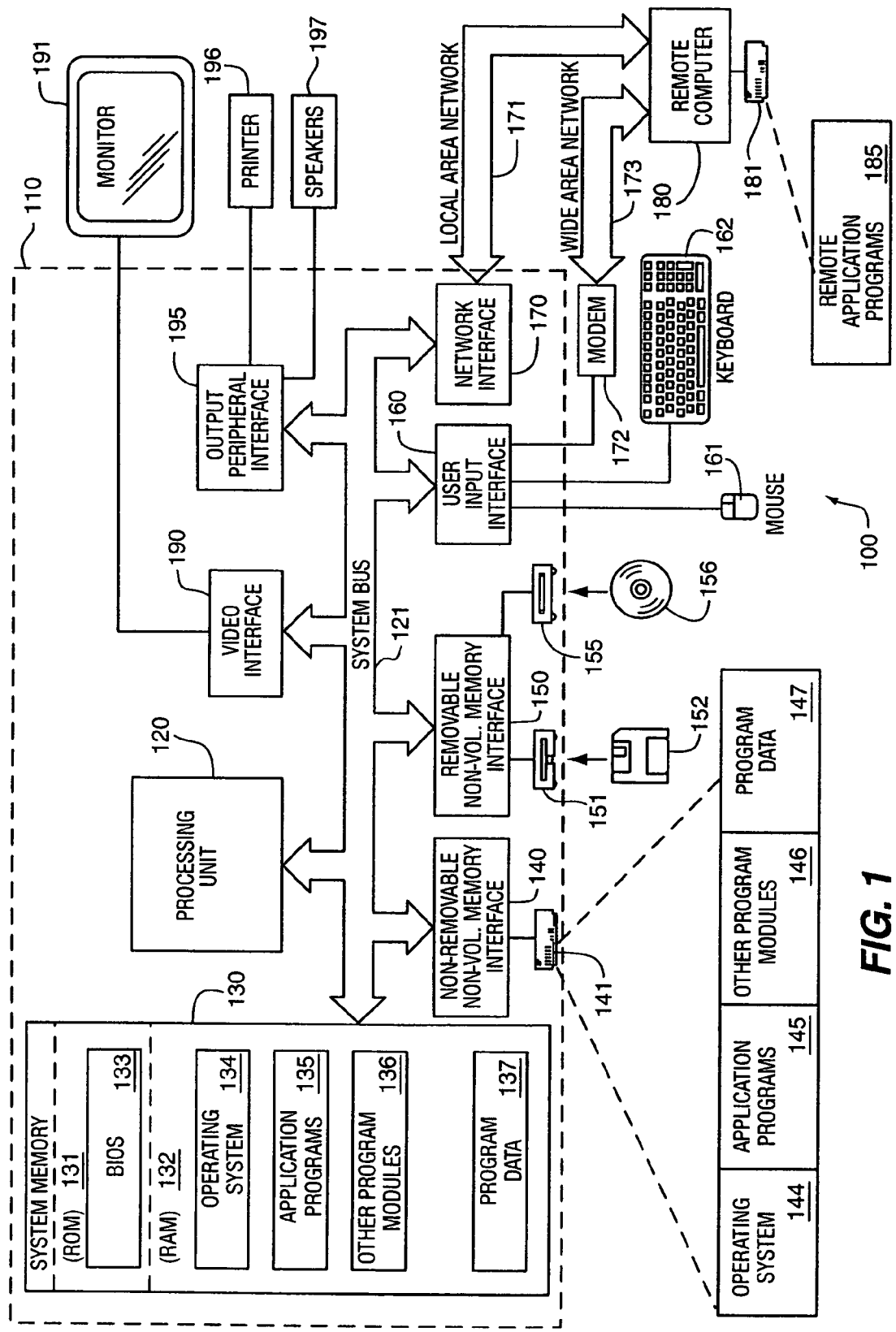
FIG. 1 illustrates an example of a suitable computing system environment on which one or more aspects of the invention may be implemented.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Using systems such as the above, participants (e.g., a web service, local application, or other software) may participate in activities that bind them to a particular role, or behavior. An activity refers to any arbitrary action that may be performed and includes but is not limited to, for example, transferring of funds, stock ticker lookup, bidding in an auction, and the like. When an activity is created, the activity is associated a set of behaviors of the activity. Alternatively, there may be multiple behaviors, where each behavior of the activity expressed a role that may be played by one or more of the participants. Each behavior is described by one or more protocols. Protocols may exist in protocol sets which are collections of protocols together with behavior that determines the interactions between them. The protocols or protocol sets may specify the behavior between web services to accomplish events.

Participants that participate in the activity may do so based on their role within the activity. In this way, each participant or web service that participates in the activity may have distinct roles to play in the activity, or multiple web services may play the same role within the activity. Thus, protocols express the behavior of an activity and may enable participants or web services to participate in a coordinated outcome of an activity. For example, where the activity is an auction, individual participants may act as seller, bidder, moderator, etc., and each role's interaction with the others is defined by one or more protocols.

Any aspect of the activity configuration may be described with description languages in a self-describing manner. Such self-description may indicate any aspect of the configuration such as but not limited to the location of the activity coordinator or coordinators, the behaviors, the protocols, XML encoding with extensive descriptive information, etc. Further, communication of the behaviors to be followed by participants is flexible and may be accomplished in a variety of ways. Participants may communicate the rules directly, the system may be self-describing or there might be no advanced description.

In one example, participants may perform roles corresponding to arbitrary behaviors that may be distinct from roles and behaviors corresponding to other arbitrary participants. The arbitrary behaviors may be expressed through protocols which are composed of message exchanges. Creation of an activity or set of activities and registration of participants into the activity may establish a joint co-operation among the participants. The joint co-operation may be governed by the behaviors corresponding to the activity. Further, the various behaviors of the participants may involve web services and the web services may be in various configurations. For example, the web services may be located at distant sites, at sites distinct from each other or within a single computer.

An activity creator may create an activity by defining the behaviors, and their corresponding protocol(s) defining message exchanges, associated with the activity. After an activity is created, an activity coordinator functions as a rendezvous point for allowing participants or web services in the system to register and participate in an activity. That is, participants or web services find information about web services and may coordinate actions for the activity through the activity coordinator. Coordinators may also provide the protocol information that expresses the behaviors associated with the one or more roles of the activity. Each participant may access the coordinator to determine the protocols or behaviors associated with the activity. Thus, participants may obtain information on the behavior, protocols or rules of the activity, and join in the activity, via the coordinator. In another example, an activity coordinator is not used. A first participant (web service) may create an activity directly with one or more other participant such that the multiple web services coordinate a transactional outcome.

Protocols, or descriptions of message exchanges used in distributed applications, include specified sequences of message exchanges between participants or web services. The behavior of some protocols may be described using a finite state machine. Specific operations with the specific messages appropriate for the operations may be specified in Web Services Description Language (WSDL), and a DRI may be used to identify each protocol.

A wide range of protocols may be incorporated in the present invention. Protocols may be defined for short-lived ACID (atomic, consistent, isolated, durable) transactions or for long-running business transactions, for example. Protocol sets vary based on the kinds of activities themselves. For example, short-lived atomic transactions may include an agreement protocol such that web services may achieve uniformity on an outcome. An example of an agreement protocol is the two-phase commit protocol. In the two-phase commit protocol, a coordinator decides on an activity based on votes from participants on the outcome (e.g., abort or commit). If at least one participant votes to abort, for example, the coordinator will reach a global abort decision. On the other hand, if all participants vote to commit the transaction, the coordinator will reach a global commit decision. In phase one, the coordinator sends a prepare message to the participants which vote on the outcome. In phase two, the coordinator receives votes from all participants and decides on the outcome based on the received votes and sends the appropriate message to the participants.

As an example, an activity may be created and a first web service may participate in the activity with other web services. When the activity is created, behaviors associated with the activity are likewise created, the behaviors being expressed by corresponding protocols. The first participant may send to a second participant the identity of the coordination service to coordinate the created activity. This process may be repeated with any number of participants such that any number of participants may participate in the activity. The second participant may then register to participate in the activity. In the registration process, the second participant may contact the coordination service to determine the protocol information for its intended role in the activity. Thus, the second participant obtains protocol information for the activity and determines if coordination of the activity is possible based on whether the second participant supports any required protocol(s). The second participant may then contact the first participant to coordinate with the first participant according to the agreed protocols. After protocol agreement, the participants communicate according to the protocol(s) to perform the activity.

Figure 2:
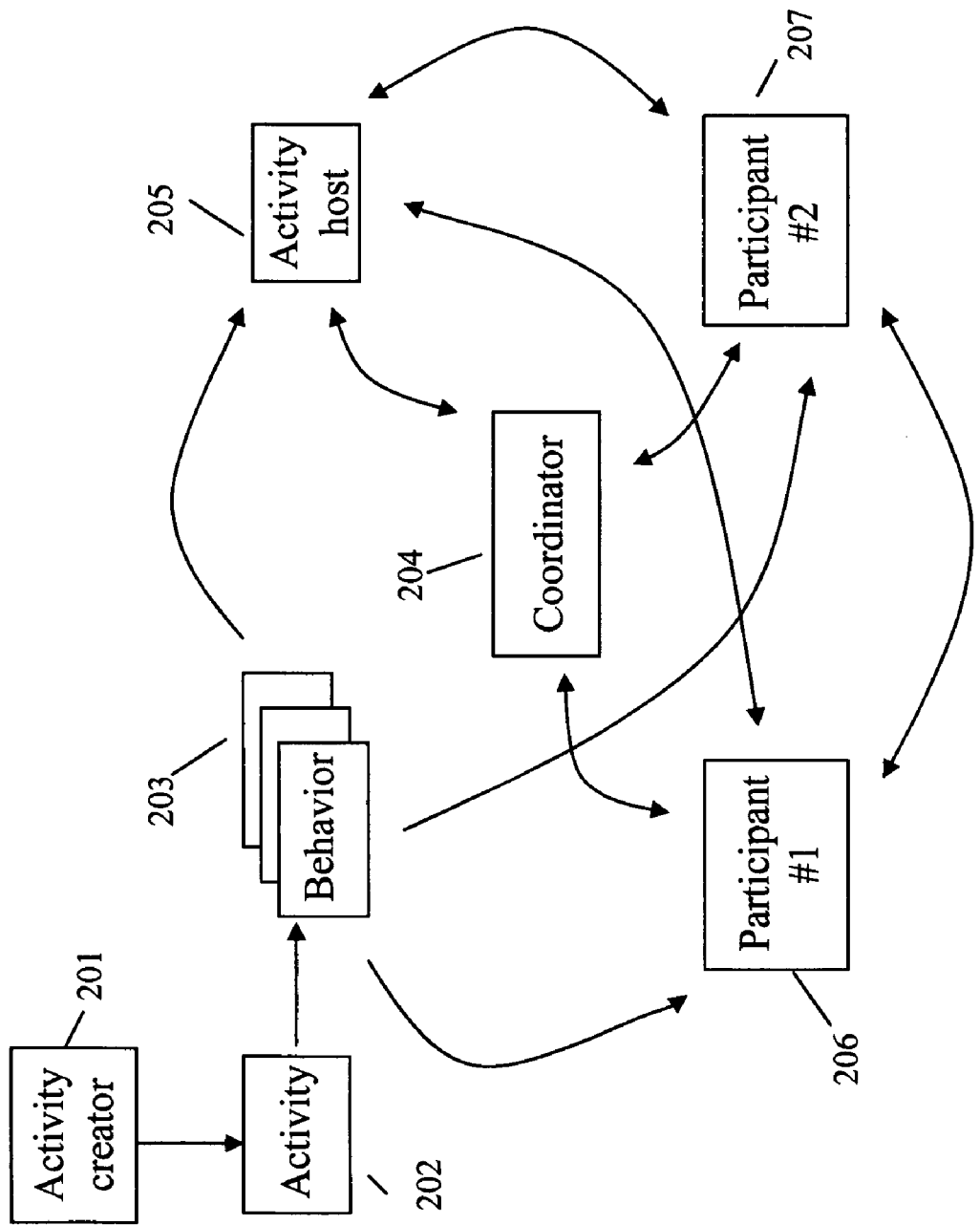
FIG. 2 illustrates an example of the present invention wherein participants register for accomplishing a coordinated outcome.

FIG. 2 illustrates an example of the present invention. An activity creator 201 creates an activity 202. The activity 202 is associated with one or more behaviors 203, which describe roles of each participant in the activity. There may be multiple behaviors 203 because each participant might not perform the same role within the activity (e.g., debtor versus creditor; buyer versus seller, etc.). Behaviors 203 of the activity 202 are defined by protocols describing message exchanges carried out by participants in the activity 202. Likewise, a behavior 203 may be expressed by several protocols. Participant #1 206 or participant #2 207 may participate in the activity 202 in roles that bind them to the behavior 203 of the activity 202. A coordinator 204 serves as a rendezvous point that allows participant #1 206 and/or participant #2 207 to register with and participate in the activity 202 based on behaviors 203 expressed by protocols corresponding to an assigned or intended role. Another participant in the activity may be an activity host 205. For example, the activity host 205 may host the activity between participants #1 206 and participant #2 207 after the activity coordinator 204 completes activity coordination. Thus, in this example, the activity host 205 would have its own behavior 203 (and corresponding protocols) associated with the activity 202 in order for the activity host to communicate with the participants 206 and 207. Likewise, each of participant #1 206 and participant #2 207 may have a behavior 203 that may be in common or may be different from any other participant that may join in the activity 202. It is noted that the example illustrated in FIG. 2 is not so limited as any number of modifications may be made. For example, there may be any number of participants with any number of behaviors and protocols. Also, the activity creator 201 may also be a participant with a particular behavior, for example.

Figure 3:
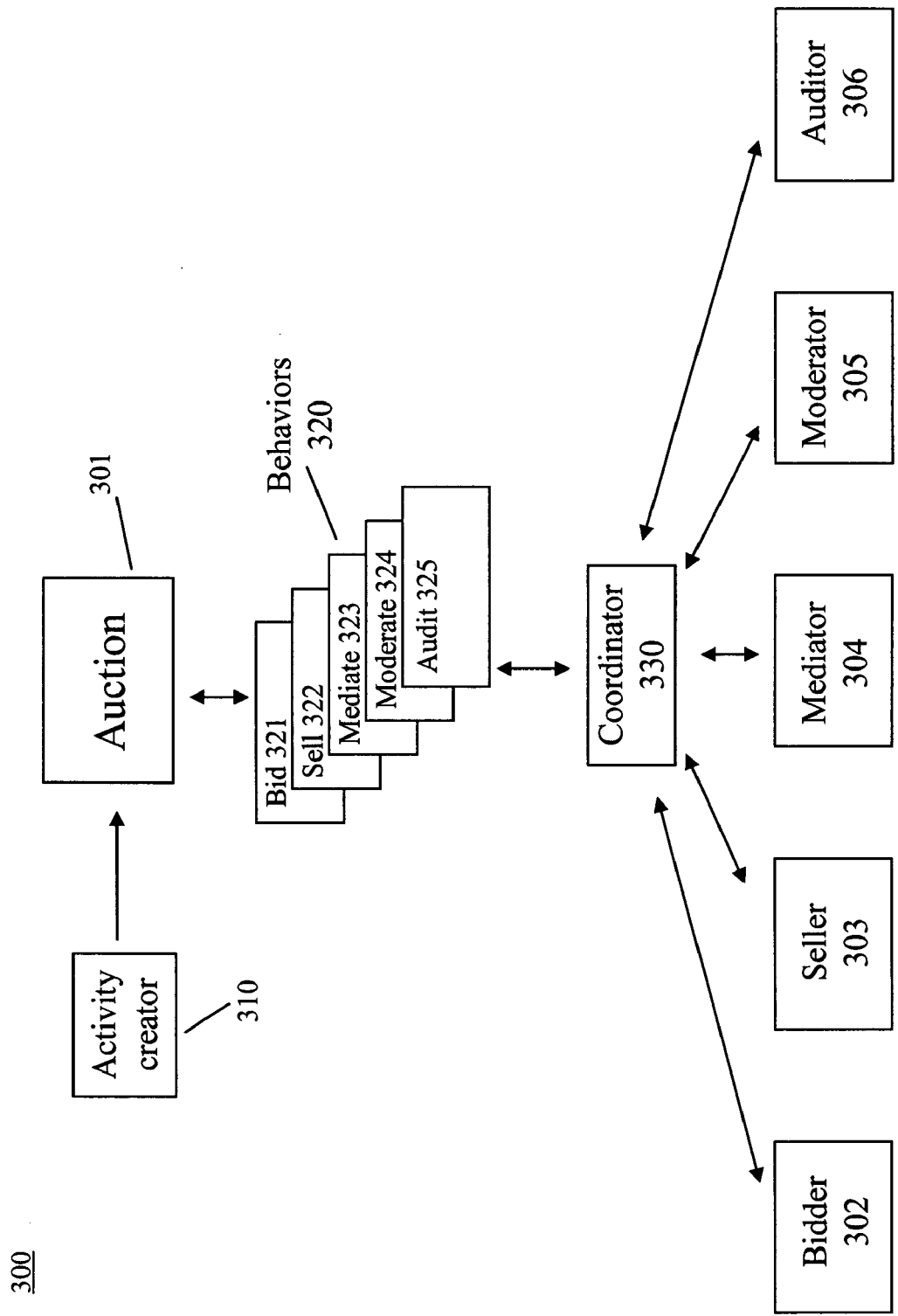
FIG. 3 illustrates an example of the present invention involving an auction system.

FIG. 3 illustrates an auction system 300 according to one or more aspects of the present invention. An activity creator 310 creates an activity, in this case, an auction 301. There are many potential participants in the activity including bidders 302 (those who buy the products), sellers 303, a mediator 304 (e.g., an entity for enforcing rules), a moderator 305 (e.g., an entity for ensuring the general operations of the auction or ensuring fairness such as providing adequate bidding time for each of the bidders or preventing bidders from being cut off, etc.), or an auditor 306 (e.g., an entity for tracking the numbers of bidders, numbers of bids, numbers and quantity of bids per bidder, etc.), for example. Each of the potential participants in the auction 301 may playa particular role in the auction 301 with each role being expressed as a behavior 320 that is described by one or more protocols. For example, the auditor 306 may join the auction 301 activity with an audit behavior 325, the audit behavior 325 being described by protocols associated with the audit behavior 325 which may be distinct from protocols associated with behaviors associated with other participants. FIG. 3 illustrates exemplary behaviors in an auction 301 including a bid behavior 321 corresponding to the behavior of a bidder 302 in the auction, a sell behavior 322 corresponding to the behavior of a seller 303 in the auction 301, a mediate 323 behavior corresponding to the behavior of the mediator 304 in the auction 301, a moderate 324 behavior corresponding to the behavior of the moderator 305 in the auction 301, or an audit 325 behavior corresponding to the behavior of the auditor 306 in the auction 301. As this example illustrates, any of the participants may have roles and behaviors that are distinct from any of the other participants.

The behaviors as illustrated in FIG. 3 may be expressed by protocols. The protocol descriptions and the behaviors 320 that they express may be stored in the coordinator 330 of the system 300. The coordinator 330 may serve as a rendezvous point where participants may register to participate in the auction 301 activity. Thus, for example, a bidder 302 wishing to participate in the auction 301 may register with the auction 301 activity through the coordinator 330, the coordinator 330 containing the protocols and the bid behavior 321 corresponding to bidding in the auction 301 activity. Each of the other participants may likewise register for the auction 301 activity through the coordinator 330 and a behavior or protocols of the corresponding participant. One of skill in the art will appreciate that the activity coordinator does not necessarily store detailed protocol information, but rather only stores protocol identification information. In such a scenario, each participant learns of each protocol from a third party source.

In this example, rules may be enforced by the participants themselves in a pairwise manner. That is, if a first participant does not abide by a rule of its corresponding behavior 320, the system may police itself through pairwise enforcement, for example, the second participant with which the first participant is communicating may produce an error condition as determined by their respective protocols. In this way, any two participants can jointly operate according to predetermined behaviors.

Figure 4:
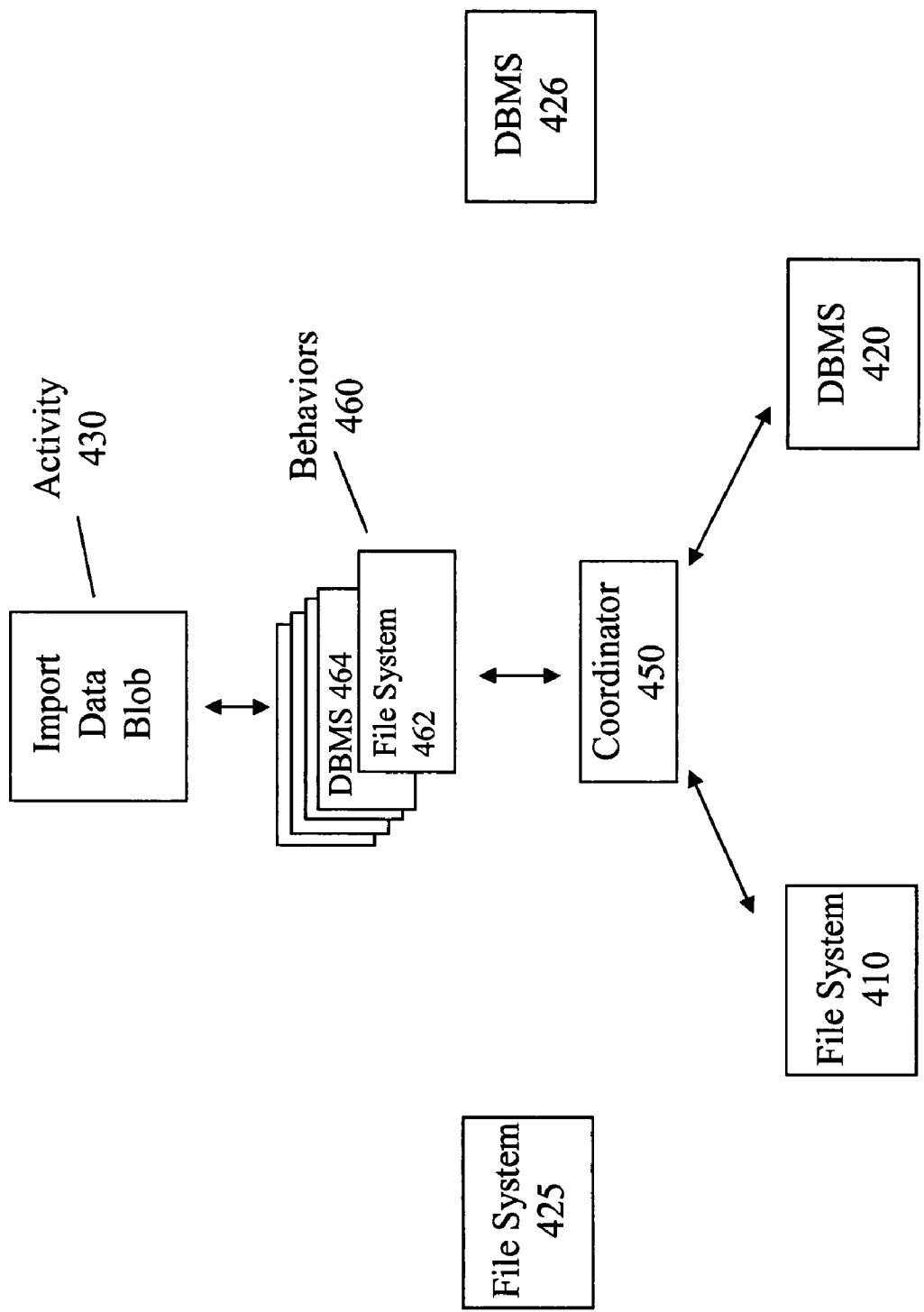
FIG. 4 illustrates an example of the present invention involving a file management system.

FIG. 4 illustrates another example of the present invention. In this example, a file system 410 and a database management system (DBMS) 420 are participants in an activity 430 including importing a file from the file system into the database management system. Thus, the activity 430 in this case is inputting binary data from a file system into a database management system 420. The file system 410 and the database management system 420 represent two participants in the activity. Each participant may register through a coordinator 450, or may coordinate the activity directly with each other.

The file system 420 illustrated in FIG. 4 may constitute one potential participant in the activity 430 that contains code to extract information about a particular file. Likewise, the database management system 420 is another potential participant that may contain code to import a file and store the file within the DBMS. The activity 430 is created to extract the information about a particular file from the file system 410 and to insert the file into the DBMS. When each participant registers through a coordinator 450, the participants may receive protocol information corresponding to their roles from the coordinator 450. That is, each participant registers with the coordinator for certain protocols, and the participants communicate according to the protocols to import the file from the file system into the DBMS. Thus, the behaviors 460 of the two participants (i.e., the file system 410 and the database management system 420) produce a coordinated outcome.

Using the above-described model of transaction coordination, participants can dynamically learn about and participate in various activities. According to an illustrative embodiment, participants communicate using SOAP messages, coordinating transactions using SOAP headers and body data elements. One of skill in the art will appreciate that transaction coordination as taught herein can also be achieved using Java-based languages.

Figure 5:
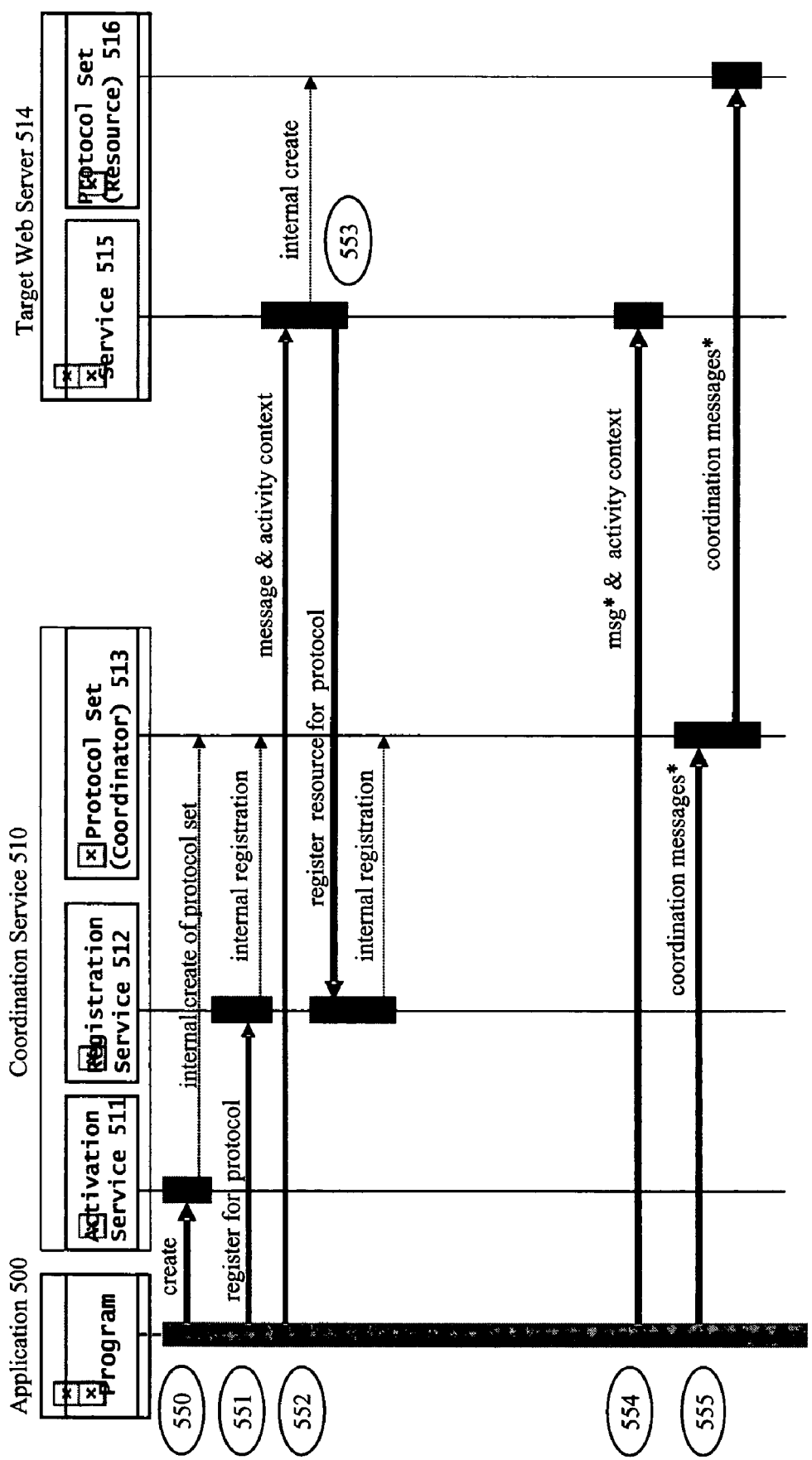
FIG. 5 illustrates coordination services and interactions of web services according to an illustrative embodiment of the invention.

FIG. 5 illustrates an example of a transaction coordination method. An activity host, e.g., an application program, may create an activity (step 550) and contact an activation service 511 of a coordination service 510 to establish the data needed to coordinate relationships between participants in the activity. This data is referred to as the activity context, and may include a DRI identifier, a reference to a registration service 512, and optionally an expiration date for the activity. An identifier may be provided for the activity during activity creation and the protocols may be assigned to the activity. The application 500 may also register for a protocol in the activity (step 551), to enable to application to participate in or manage the activity. The application 500 may then send the activity context to a second participant 514 (step 552). This enables the second participant (web service) to participate in the activity by registering with the registration service 512 (step 553). The context lists information used to perform the coordinated action and may include, for example, a state machine. An example of an activation request from an application in Web Services Description Language (WSDL) format is as follows:

```
<wstx:create>
    [ <wstx:protocolIdentifier uri=. . . [prefix=. . .]? [register=. . .]?
        /> ] +
    [ <wstx:expirationDate dateTime=. . . />]?
    [
        <connect>
        <activityContext> . . . </. . .>
        [<protocol uri=". . ." />]+
        <connect>
    ]?
    [< -- Extension Element -- > ]*
</wstx:create>
```

In this example, the /create/protocolIdentifier element identifies a protocol or set of protocols which should be supported by the newly created activity and the /create/protocolIdentifier/@uri element carries a namespace URI associated with the protocol or set of protocols to be supported by the newly created activity. @prefix, @register and @dateTime are optional attributes. @prefix indicates that the protocol URI identifies a set of related protocols using a common URI prefix if TRUE; @register indicates that the caller requests to register with the respective protocol if TRUE; @dateTime indicates that the activity is expected to complete before the specified date or time if not constrained by a particular protocol. The /create/connect element, if present, indicates that the newly created activity should be connected or registered with a protocol of an already existing activity. The /create/connect|activityContext element carries the activity context of the already existing activity. The activity context indicates which protocols are supported by the activity and may carry a reference to the registration service associated with the activity. The /create/connect|protocol/@uri element identifies a protocol with which to register the newly created activity. Extension elements may be added at the /create/{any} element.

The activation service 511 may create a set of protocols associated with a newly created activity as well as connect or register protocols of a newly created activity with protocols of an already existing activity. By registering protocols of new activities with protocols of already existing activities, creation of local coordinators is possible. In this way, network traffic and intercept messages across trust boundaries may be reduced. In addition, different protocols may be selected by the application for connecting or registering a newly created activity. For example, depending on the needs of the application, the application may register or connect the newly created activity with an agreement protocol. Alternatively, the application may select a nested coordination protocol with which to register or connect the newly created activity.

Upon creation of the protocol set associated with the created activity, the activation service 511 returns an activity context to the application. The activity context may optionally include an expiration date for the activity which indicates the date and time after which the activity is expected to terminate if not constrained by the state of the particular protocol. An example of an activity context using Web Services Description Language (WSDL) format is as follows:

```
<wstx:activityContext>
    <wstx:activityIdentifier uri=. . . />
    <wsdl:service name="RegistrationService"> . . . </. . .>
    [ <wstx:expirationDate dateTime=. . . />]?
    [< ---- Extensibility Element --- /> ]*
</wstx:activityContext>
```

In this example, the /activityContext/activityIdentifier/@uri element carries the activity identifier and the /activityContext/service element carries a WSDL service element containing the service reference of the registration service associated with the activity. Also, the optional expiration date element is represented by the /activityContext/expirationDate/@dateTime element. This element indicates the date or time after which the activity is expected to terminate. Following this date or time, received messages carrying the activity context would be discarded. Extension elements may also be added to the activity context as illustrated by the /activityContext/{any} element. The extension elements may be used to communicate implementation specific information between participants including, for example, isolation levels.

An activity context may be added to SOAP messages as well. The following example demonstrates adding activity context to SOAP messages in a SOAP header:

```
<SOAP-ENV:Header>
    <wstx:activityContext
        xmlns:wstx=" http://. . ./2002/1/transaction" SOAP-
            ENV:mustUnderstand= "1">
        . . .
    </wstx:activityContext>
</SOAP-ENV:Header>
```

As illustrated in the above example, <wstx:activityContext . . . </wstx:activityContext> demonstrates the activity context described in a SOAP message.

After the activation service 511 returns the activity context in application messages containing a reference to the registration service associated with the activity, other participants may use the activity context to register with protocols supported by that activity. The registration service is a service that functions as a rendezvous point for participants to connect to an activity. A web service may contact the registration service to determine protocol information corresponding to protocols used in the activity and determine whether the activity may be coordinated between a first web service or participant that created the activity and the web service or participant that may participate with the first web service or participant in the outcome of the activity.

An activation response may also be created to indicate that activation has been successfuilly completed. The activation response may provide information about the activity such as the activity context or reference to the protocols associated with the activity. An example of an activation response in WSDL format is as follows:

```
<wstx:created>
    <wstx:activityContext> . . . </. . .>
    [
        <wsdl:service>
            <wstx:interfaceReference name="ServiceInterface" />
        </wsdl:service>
    ]*
    [ < -- Extension Element --- > ]*
</wstx:created>
```

In this example, the activity context of the newly created activity is contained in the /created/activityContext element. The /created/service element carries a service reference to one of the protocols which has been selected on the create request for registration, the interfaceReference element identifies the service interface and the InterfaceReference/@name attribute carries the QNAME of the respective service interface. Service interfaces document supported protocols and may be associated with a collection of port types. Port types are sets of operations that are supported by one or more web service or endpoints, the sets of operations being descriptions of actions supported by a service or a collection of related web services or endpoints. Service interfaces define operations and message types associated with a particular protocol. An exemplary service interface may be represented as follows:

```
<wsdl:definitions>
    <wstx:serviceInterface name=". . .">
        [ <wxtx:export portType="localPortType"/> ]*
        [ <wstx:import portType="remotePortType"/> ]*
    </wstx:serviceInterface>
</wsdl:definitions>
```

Service References provide addressing information for a set of port types and may carry correlation tokens and other information to identify a state associated with the invocation of a particular service. A correlation token references a protocol set that may be associated with an activity and may be encoded as URIs and carried in a correlationToken extension element as illustrated in the following example:

```
<wsdl:service>
    [
        <wsdl:port name=. . . binding=. . .>
            [<wstx:correlationToken uri=. . . />]?
        </wsdl:port>
    ]+
</wsdl:service>
```

The coordination service may participate in the registration of participants or web services to an activity. In one illustrative embodiment, a first web service may communicate the identity of the coordination system and a desire to coordinate an activity with a second participant or web service. Using successive peer-to-peer interactions, any set of participants or web services may join in a common activity, such as a transactional activity. The second web service may register to participate in a transactional activity by obtaining relevant protocol information from the coordination system and can determine if coordination of the activity may be implemented. Each participant or web service may offer a set of capabilities and define requirements for an acceptable engagement. The participants may offer a particular set of protocols which the participants support and may also require a particular set of protocols to successfully participate in joint activity or engagements. A corresponding service or engagement in a distributed activity may be invoked if requirements of the parties are met. Conversely, a service might not be invoked if the requirements of either party are not satisfied.

As an example, if a protocol is supported or required in a first or sender web service, a second or receiver web service would accept engagement if the protocol is supported or required in the second web service. If the protocol is required in either the first or second web service under these circumstances, the required nature of the protocol would make acceptance of the engagement at the second (i.e., receiver) web service necessary for engagement. If the protocol is required for the first (i.e., sender) web service, then acceptance of the engagement at the second (i.e., receiver) web service would be necessary to allow distributed activity. If the second web service does not support the protocol under these circumstances, then the engagement would be rejected. Likewise, if the protocol is not supported in the first web service but required in the second web service, the engagement would be rejected. Table I illustrates this exemplary distributed activity acceptance scheme.

TABLE 1

| Sender | Receiver | | |
| --- | --- | --- | --- |
| | Protocol Not Supported | Protocol Supported | Protocol Required |
| Protocol Not Supported | | Accept | Reject |
| Protocol Supported | Accept | Accept (Optional) | Accept (Mandatory) |
| Protocol Required | Reject | Accept (Mandatory) | Accept (Mandatory) |

Notably, there are no limitations to the mandates of the protocol as the specific protocols decide how an activity will terminate rather than being mandated centrally by the coordination service. The registration service 512 may allow applications and other coordination services to register for protocols in a protocol set. The activity context returned by the create operation may contain a service reference to the registration service associated with a particular activity. On registration, a participant selects one of the available protocols and provides a service reference to its imported port types. An exemplary registration service in WSDL format is as follows:

```
<wsdl:definitions>
    <wsdl:portType name="RegistrationPortType">
        <wsdl:operation name="registerOperation">
            <wsdl:input message="wstx:register"/>
            <wsdl:output message="wstx:registered"/>
            <wdld:fault name="errorRegister"
                message="wstx:faultResponse"/>
        </wsdl:operation>
    </wsdl:portType>
</wsdl:definitions>
```

An application may itself register with an available protocol to control progress of an activity. An exemplary registration request in WSDL format is as follows:

```
<wstx:register activityURI=... protocolURI=...>
    [<wsdl:service name="ResourceService"> ... </...> ]?
    [< -- Extension Element -- > ]*
</wstx:register>
```

In this example, the /register/@activityURI attribute carries an activity identifier to identify the activity and the /register/@protocolURI attribute carries a protocol identifier for identifying a protocol supported by the activity. Additional information may be conveyed through the extension elements such as business level agreement protocols. Participants issuing multiple registration requests typically register with multiple protocols.

When registration has been successfully completed, a registration response may be generated. An example of a registration response is as follows:

```
<wstx:registered>
    [<wsdl:service name="coordinatorService"> ... </...>]?
    [ < -- Extension Element -- > ]*
</wstx:registered>
``` where the /registered/protocol/service element containing endpoint information for the exported port types of the respective service type of the selected protocol. The "extension element" parameter may be used to add additional information that may be needed for specific activities. Such additional information may vary based on the needs of the particular activities to which the extension elements pertain.

If registration has not been successfully completed, a registration fault element may be generated as follows:

```
<wstx:fault
    reason=["alreadyRegistered" |
        "invalidActivityIdentifier" |
        "invalidProtcolState" |
        "invalidResourceReference" |
        "invalidProtcolIdentifier" ] >
    [ < -- Extension Element --- > ]*
</wstx:fault>
```

In the above registration fault element example, the reason for registration failure is indicated in the /fault/@reason element and additional reasons for registration failure may be provided as an extension elements as shown by the /fault/{any} element (Extension Element).

Thus, a method and apparatus is described that allows the coordination of activities or transactional outcomes of operations between participants in an activity. The participants provide message exchange protocols themselves for coordinating activities through a coordination service 510. An activity is created which indicates that a web service is ready to coordinate actions with other web services and provides an identifier for the web service and a URI identifying the description of the protocols supported by the web service. The coordination service 510 further functions in the registration of participants to an activity wherein a target Web Service may register to participate in transactional activity with a first web service. In this way, the specific protocols determine the termination of the activity or whether a participant may be unregistered from an activity. In this example, an application 500 participates in a newly created activity (step 550). The activation service 511 of the coordination service 510 determines protocols associated with the newly created activity and returns an activity context which contains an activity identifier (DRI identifier) and a reference to a registration service. The activity context may further contain an expiration date or time for the activity after which time the activity will terminate. The application 510 may register for the protocols associated with the newly created activity (step 551) which may be associated with an internal registration to a protocol set (coordinator) 513.

FIG. 5 further illustrates message and activity context exchange (step 552) wherein the activity context is sent to a service interface 515 of a participant such that a web service may communicate with a target web service to coordinate the activity with the target web service 514. The target web service 514 may internally create protocols and register to participate in the activity by contacting the registration service 512 of the coordination service 510 (step 553). Through this contact, the target web service 514 determines the protocol information associated with the desired activity. The target web service 514 may be internally registered with the protocol set coordinator and the protocols associated with the desired activity. The target web service, after having received the protocol information, determines whether coordination of the activity for a uniform outcome with other participants may be accomplished. FIG. 5 illustrates the coordination of two web services but it is understood that any number of web services may participate in transactional activity by contacting the coordination service 510. Steps 554 and 555 in FIG. 5 illustrate additional message exchanges between the web services for coordination and outcome of the activity.

In addition to the above, long-lived business transactions may be coordinated with a web service. The web service participates in the creation of the activity and the implementation of the corresponding protocols through the coordination service. The protocols may be published as part of the protocol descriptions and may be communicated to the coordination service during creation of the activity. The web service may contact a second web service for coordination of transactional activity with the second web service so that the second web service may participate in the completion of the activity in conjunction with the first web service. The second web service may contact the coordination service to determine that the activity is associated with a long-lived transaction protocol and may establish joint work under the protocol with the first web service if there is correspondence of capabilities and requirements of the protocols between the web services. In coordination of an activity, the protocols might not be pre-specified and the web services or participants may determine the protocols associated with the activity in a variety of ways. For example, the web services or participants may communicate among themselves to determine the protocols. Alternatively, the protocols may be made available for use by the web services or protocols such that there is no need for direct communication between the web services or participants to determine a protocol.

Figure 6:
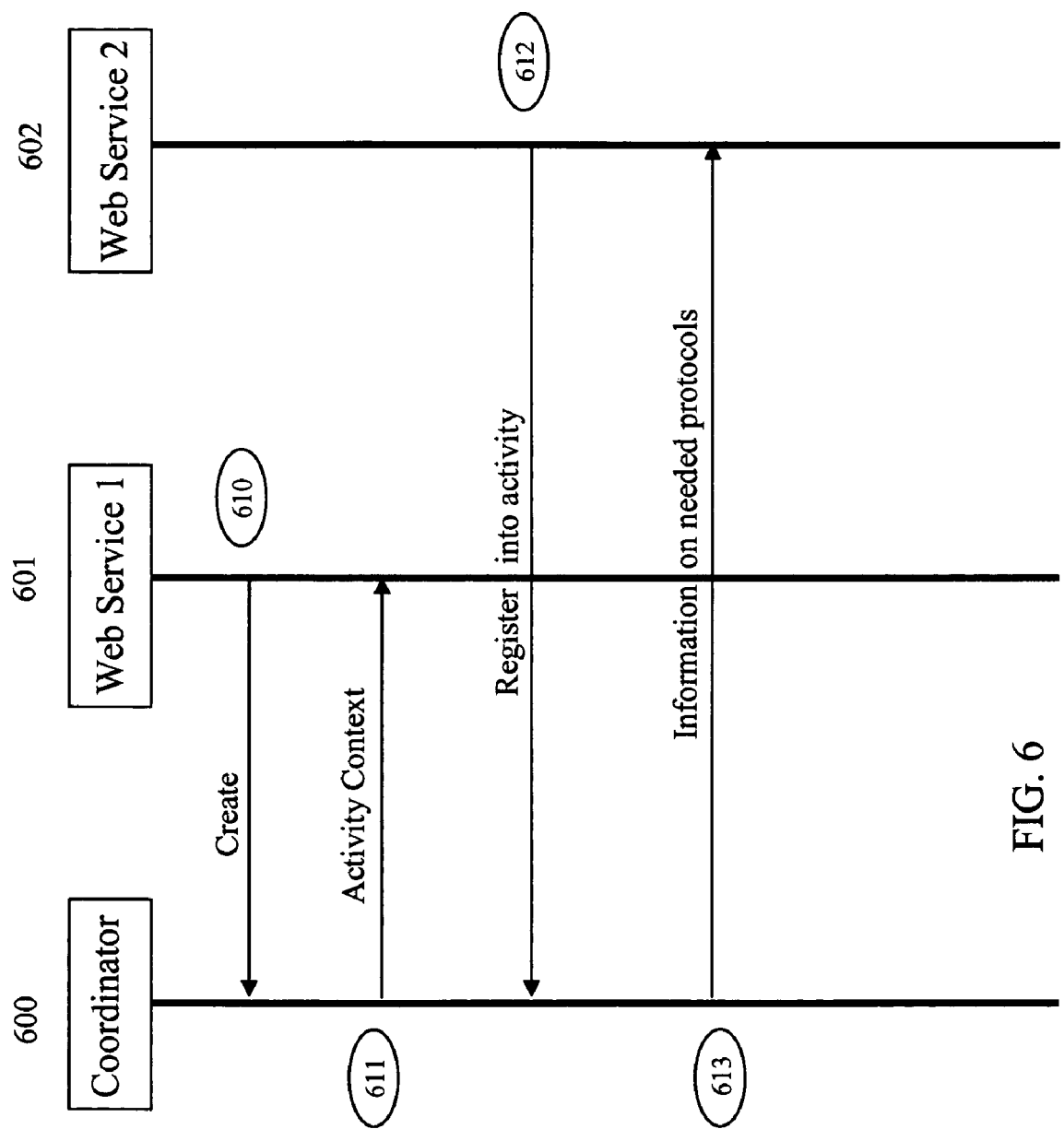
FIG. 6 illustrates a web services coordinating activity with a coordination service according to an illustrative embodiment of the invention.

FIG. 6 depicts another illustrative embodiment of the present invention. In this example, a first participant (web service) 601 sends a message to a coordination service 600 to create an activity and the associated protocols that correspond to the activity (step 610). The coordination service 600 receives the message from the first web service 601, creates the activity and associated protocols and sends an activity context to the first web service 601 (step 611).

In step 612, a second web service desiring to participate in the activity requests registration with the coordination service 610. The second web service contacts the coordination service to obtain relevant references to the needed protocol information. Protocol information is returned to the second web service (step 613) so that the second web service may determine whether the activity may be coordinated. That is, the second participant determines whether it (the second participant) supports any protocols that are required to participate in the activity (or has the capability to learn any necessary protocols). For example, the second web service may determine if the needed protocols contain required protocols. If protocols are required and the second web service does not support (and cannot learn) the required protocol, then activity engagement may be rejected. Likewise, if the second web service requires a protocol but the protocol is not supported by the first web service, then the activity engagement is also rejected since there would be a capabilities and requirements mismatch between the first and the second web services. However, if protocol requirements match between the first web service and the second web service (i.e., both web services support the protocol), then the activity engagement may be accepted. If neither the first web service nor the second web service support the protocol, but other protocols match, then the capabilities and requirements of the first web service and the second web service are matched and the activity engagement may be accepted, if necessary.

Figure 7:
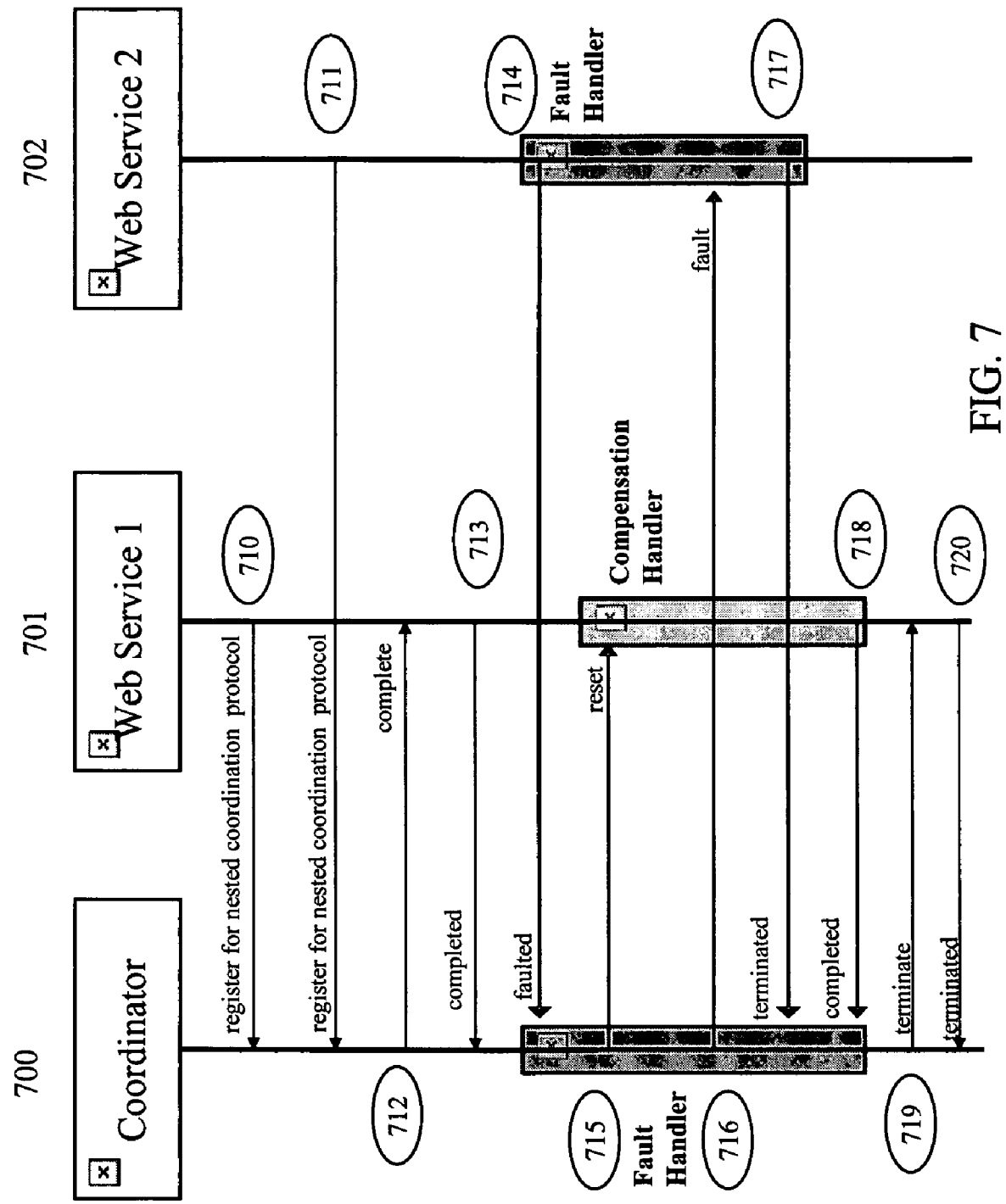
FIG. 7 illustrates a web services coordinating activity with a coordination service and message flow for nested coordination protocols and fault handling according to an illustrative embodiment of the invention.

FIG. 7 illustrates another aspect of the present invention. FIG. 7 illustrates message flow for nested coordination protocols and fault handling. In step 710, a first web service 701 requests registration for a nested coordination protocol to the coordination service 700 and in step 711, a second web service 702 requests registration for a nested coordination protocol to the coordination service 700. The coordination service 700 returns a completed message to the first web service 701 that may indicate that the nested coordination protocol has been registered (step 712). The first web service 701 returns a completed message to the coordination service 700 that may indicate that the first web service 701 has acknowledged receipt of the message from the coordination service 700 and has completed actions associated with the activity (step 713). In this example, the second web service 702 may be unable to participate in the activity and issues a fault notification and locally performs fault processing to compensate for the effects of already completed actions (step 714). The fault handler at the coordination service receives the fault message from the fault handler of the second web service and issues a reset notification to the compensation handler of the first web service 701 (step 715) (after the first web service 701 had already issued a completed message indicating that actions associated with the activity had been completed). Upon receipt of the reset notification, the compensation handler performs steps to compensate for the effects of already completed actions. The nature of the compensation for the effects of already completed actions vary and depend on the particular business process executed. One non-limiting example includes data roll-back. When all compensating actions are completed, the compensation handler issues a completed message to the coordination service (step 718). The coordination service 700 issues a fault notification to the fault handler of the second web service 702 (step 716) and the fault handler of the second web service 702 returns a terminated message to the coordination service 700 (step 717). The coordination service 700 issues terminate, fault or reset notifications to the web services. Fault or reset notifications cause the web service to compensate for the previously executed compensating actions. Terminate notifications cause a web service to terminate execution and to discard all data as well as state information corresponding to compensation actions.

The coordination service 700 retains fault information until the web services indicate that they have received fault or compensate notifications. The coordination service 700 issues a terminate message to the first web service, for example (step 719) and the first web service returns a terminated message to the coordination service 700 in response (step 720).

A transaction may involve a collection of web services all in one computer, for example, or a collection of interconnected web services or other participants. There are many different kinds of systems that utilize transactional characteristics. Examples of such systems include file systems, database management systems or debit/credit systems. In a file system, for example, data records may be contained within storage of a system of interconnected web services or participants such that the data record may be updated to reflect the most recent information. As an example, a file system may contain data records of customers who may have placed orders at an online store. The data records may contain name, address, ordering information, credit card number, etc. of each customer. The information in the data records may need to be updated, for example, if a customer changes his/her name or address or wishes to change the default credit card number (wishes to use a different credit card). When changes to the existing data are desired, an update must be performed to the data. Alternately, data in the data records of a file system may be updated on regular intervals such that information is maintained in a current and up-to-date state. In any event, a generalized update management system may be used to ensure that data is kept current and that the updated data may pass the ACID test of atomicity (updated completely or not at all), consistency (updated data is consistent), isolation (updating one data record does not adversely affect other data records and overall data integrity is maintained) and durability (updated data remains stored and reflected in the system). ACID properties are particularly important in environments where strict consistency is desired. However, in some environments, the ACID test might not be necessary. For example, in loosely-coupled computations among web services, atomicity may be better achieved through the compensatory actions described above.

In this illustration of a file system, database management system or online store, a user at an endpoint (i.e., a participant or web service) may create an activity (i.e., to place an online order). The participant contacts a coordination service that communicates the protocols associated with the activity of placing an online order. A second participant may join in the activity with the first participant by accessing the registration service of the coordination service to obtain protocol information. The second participant may determine if it may participate in the activity based on the protocols that are associated with the activity (i.e., the second participant registers with the activity). For example, if the protocol associated with the activity is required by both the first and the second participant, then the protocol is accepted. Conversely, if the protocol is required by one participant but not supported by the other participant, then the engagement of services is rejected. Because the protocols and message exchanges are specified by the participants themselves, the participants may effectively coordinate to produce a coordinated outcome of a joint activity, in this case, placing an online order. Notably, there is no limitation as to what the protocol mandates as it is up to the specific protocols to determine the progression of the activity. After the registration of the second participant is successfully completed, the participants work jointly by further exchanges of messages, activity contexts, and coordination messages to produce a coordinated outcome.

As another example, a debit/credit system may utilize the present invention. In a debit/credit system, for example, a user at a remote site or participant may access a system at a financial institution to perform a financial transaction. In this example, a customer may request to make a monetary withdrawal from an account. The system receives the request from the customer, debits the requested amount and updates the data records. The completed transaction would need the coordinated efforts of multiple participants. In this case, the customer at the remote site and the financial institution must coordinate their activities, each participant (the customer and the financial institution) contributing to the final outcome of the activity (withdrawal of funds and updating of records). As in the previous example, the data would pass the ACID test for maintaining data integrity if strict consistency is desired. Alternatively, in loosely-coupled actions, atomicity may be achieved through compensatory actions as described. The user would create an activity (e.g. withdrawal of funds) and a coordination service may communicate a protocol set corresponding to the activity. The user or first participant may communicate a desire to coordinate the activity of the financial transaction with a second participant by communicating the identity of the coordination service. The second participant, e.g., a debit center, registers with the activity through the protocol information obtained from the coordination service. After the second participant has determined the protocol information and determined that coordinating activity with the user may be achieved, further messages and coordination messages are exchanged to achieve a coordinated outcome. Because the protocols needed for the activity are prescribed by the participants themselves, the participants orchestrate the coordination among them in an extensible manner, thus resulting in increased flexibility of the system.

As another example, individual computer game players may participate in an electronic game over the web. A first player may create an activity (i.e., an instance of a game) as well as specify all of the associated behaviors of the activity, the associated behaviors being specified through protocols or a protocol set. A coordination service may provide the protocol set associated with the activity of playing the game to participants in the activity such that the protocols or protocol sets are made available to other participants who wish to participate in the game. The first player may contact a second player to invite the second player into the game. The first player sends the identity of the coordination service to the second player such that the second player may contact the coordination service to register, i.e., the second player finds the protocol information of the first player to participate in the coordinated activity (i.e., playing the game). Any number of participants may join in the common transactional activity (playing the game) utilizing this method and apparatus with the coordination service functioning as a rendezvous point where participants may create activities and protocol sets and other participants may access the coordination service for protocol information determining if additional participants may join in.

As stated above, there is no limit on the number or type of protocols that may be used to coordinate transactions. Examples of protocols that can be used include both protocols for short-lived ACID transactions and protocols for long-running transactions. These transaction protocols include agreement protocols such as the two-phase commit protocol, completion protocols, completion protocols with acknowledgement, PhaseZero notification protocol, and nested coordination protocol.

Although preferred illustrative embodiments of the invention have been shown and described, a wide range of modification, change and substitution is intended in the foregoing disclosure and in some instances some features of the present invention may be employed without a corresponding use of the other features. Thus, it should be noted that the invention can be practiced otherwise than as specifically illustrated and described without departing from its spirit or scope. Accordingly, it is appropriate that the appended claims be construed broadly and in a manner consistent with the scope of the invention.

What is claimed is:

1. A method for coordinating an activity between a first web service and a second web service, the method comprising:

receiving a request for an activity from the first web service;

defining one or more behaviors associated with the requested activity;

defining a message exchange corresponding to the requested activity;

sending to the first web service an address of a coordination service and an activity identifier corresponding to the requested activity;

receiving a request for information of the message exchange from the second web service after the second web service receives the address of the coordination service and a request to coordinate the requested activity from the first web service;

transmitting to the second web service information on the message exchange corresponding to the requested activity responsive to receiving the request for information of the message exchange from the second web service;

coordinating the requested activity between the first web service and the second web service based on the message exchange.

2. The method of claim 1 wherein each behavior corresponds to a composition of web service function.

3. The method of claim 1, wherein the coordinating step comprises accepting the coordination of the activity between the first and second web service if the message exchange corresponding to the requested activity is supported or required in the first web service and the second web service.

4. The method of claim 1, wherein the step of receiving a request for information of the message exchange from the second web service comprises registering second web service to the activity, wherein the second web service registers for a second selected behavior.

5. A computer-readable storage medium having computer-executable instructions for performing the method of claim 1.

* * * * *